United States Patent Office 3,529,853
Patented Sept. 22, 1970

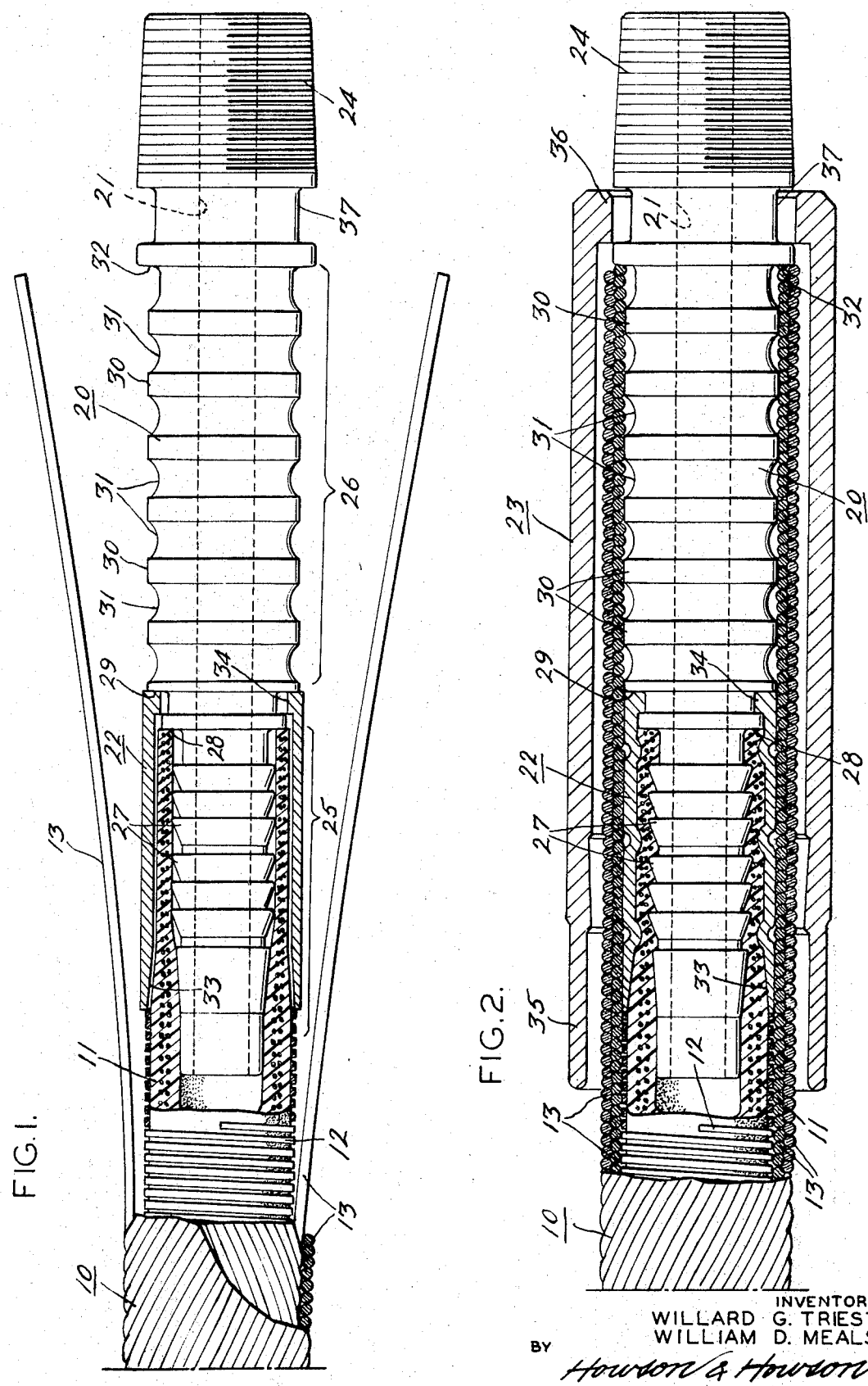

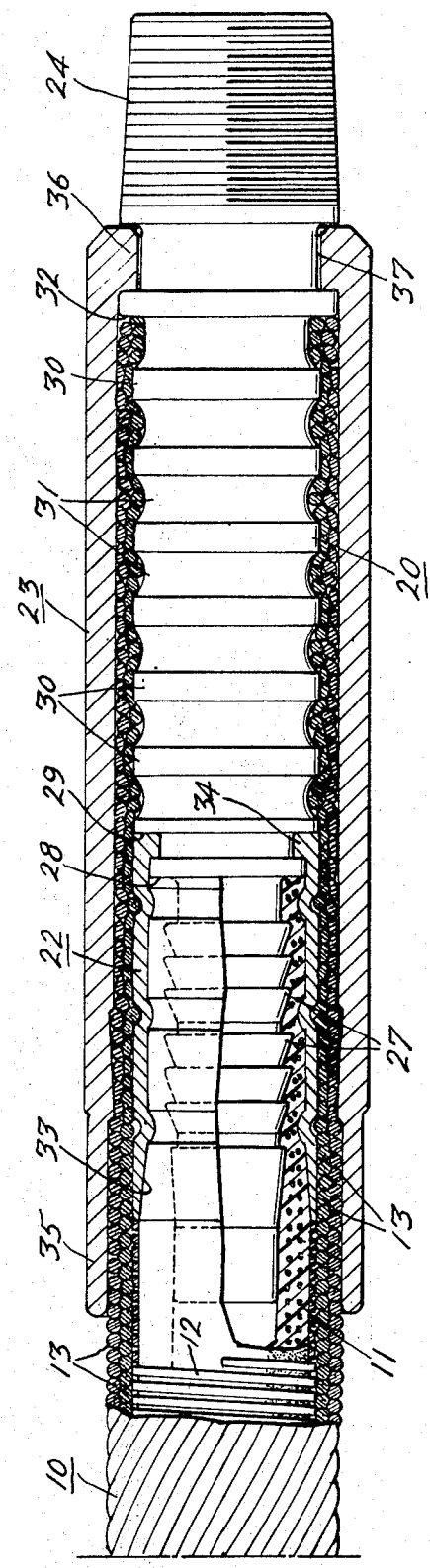

3,529,853
CABLE HOSE COUPLING
Willard G. Triest, Annapolis, Md., and William D. Meals, Lancaster, Pa., assignors of one-half to Hydrasearch Co., Inc., Annapolis, Md., a corporation of Maryland, and one-half to Lift-All Company, Inc., Manheim, Pa., a corporation of Pennsylvania
Continuation-in-part of application Ser. No. 623,920, Mar. 17, 1967. This application May 20, 1969, Ser. No. 826,230
Int. Cl. F16l 33/20
U.S. Cl. 285—149                                6 Claims

ABSTRACT OF THE DISCLOSURE

Apparatus for effecting a coupling to cable hose of the type comprising an inner hose body, an intermediate flat ribbon-like spring wire portion wound about the hose body and an outer covering of wires wound preferably in opposite directions about the intermediate flat wire portion. The coupling comprises a nipple, an intermediate sleeve and an outer ferrule connected at one end with the nipple. The nipple in turn has a forward pressure-sealing section and a rearward tensile section. The central hose body portion is positioned about the forward pressure-sealing section of the nipple and the intermediate sleeve is swedged or otherwise contacted about the hose body portion to form a sealing contact between the hose body portion and the pressure-sealing portion of the nipple. The intermediate flat wire portion is terminated at the forward end of the intermediate sleeve while the outer rows of wires continue externally of the intermediate sleeve for the full length of the rearward tensile section of the nipple. The outer ferrule overlies both the tensile and pressure-sealing sections of the nipple and is swedged or otherwise compressed about the outer wires to securely lock the wires between the rearward tensile section of the nipple and the outer ferrule.

---

This application is a continuation-in-part of a prior application entitled Cable Hose Coupling, Ser. No. 623,-920, filed Mar. 17, 1967, by Willard G. Triest, now abandoned.

The present invention relates to a cable hose coupling and more particularly to a coupling for cable hose which will withstand extremely high tensile and hydraulic stresses.

A primary object of the present invention is to provide a novel cable hose coupling for connection to cable hose which will provide a connection with the cable hose which will withstand high pressures and high tensile stresses.

Another object of the present invention is to provide a novel cable hose coupling for connection to hose of the type having an inner hose body and an outer wire wrapping in which a unitary nipple member is provided with successive pressure-sealing and tensile sections which are received within the hose with the inner hose body firmly secured to the pressure-sealing section of the nipple and the outer wire securely connected to the tensile section of the nipple.

A further object of the present invention is to provide a novel hose coupling of the above type which has relatively small dimensions with the outer surface of the coupling being relatively smooth and not greatly exceeding the diameter of the cable hose to which the coupling is attached so that the coupling and hose may be passed through relatively small openings without the danger of the coupling getting snagged and in which the length of the coupling is such that the hose and coupling may be wrapped about a drum during storage and use.

A still further object of the present invention is to provide a novel hose coupling having relatively few parts and which may be manufactured easily and cheaply and quickly connected to cable hose.

These and other objects of the present invention and the various features and details of the operation and construction thereof are hereinafter more fully set forth and described with reference to the accompanying drawings in which:

FIG. 1 is a side elevational view partially in section of the nipple and intermediate sleeve portion of the cable hose coupling of the present invention and the terminal end portion of a length of cable hose in position to be connected to the coupling;

FIG. 2 is a view similar to FIG. 1 with the outer hose coupling ferrule in position about the outer wire cable portion of the hose; and FIG. 3 is a view similar to FIG. 2 with the outer ferrule swedged or contracted about the cable hose to complete the connection between the cable hose and the coupling.

Referring more specifically to the drawings a high pressure and tensile strength cable hose 10 is illustrated therein which comprises a central wire reinforced tubular hose body 11 about which is wound a ribbon-like reinforcing spring 12. Circumscribing the ribbon-like reinforcing spring 12 and in wrapped relation thereto is a plurality of wires 13, in the present instance two layers of wires 13 are provided with the layers of wires wrapped about the hose in opposite directions to minimize torque in the hose when the hose is subjected to high tensile stress.

In order to attach discreet lengths of the cable hose to one another or to adjacent pieces of equipment, novel coupling means are provided to enable the withstanding of tensile stress placed on the coupling when the cable hose is placed under tension and to enable the withstanding of extreme high pressures within the hose, which pressures may be in excess of 8,000 p.s.i. To this end the coupling of the present invention comprises a substantially cylindrical nipple 20 having a bore 21 extending axially therethrough, an intermediate sleeve 22 and an outer ferrule 23. The nipple terminates in one end in a coupling section 24 to permit connection to an adjacent coupling or other equipment. In the present instance, the coupling section 24 is shown as a threaded section but it will be understood that any type of coupling connection may be provided on the coupling section of the nipple.

In accordance with the present invention, the nipple 20 includes adjacent pressure-sealing and tensile sections designated as 25 and 26, respectively. The pressure-sealing and tensile sections 25 and 26 of the nipple are axially aligned with respect to one another and with respect to the coupling section 24. The pressure-sealing section 25 is at the forward end of the nipple and includes means on the exterior thereof for gripping the interior portion of the hose body 11. In the present instance, these means include a series of serrations 27. The pressure-sealing section 25 of the nipple terminates at its rearward end in a radially-extending shoulder 28. The tensile section of the nipple is axially spaced from the shoulder 28 with a shallow groove 29 being provided intermediate the shoulder 28 and the leading end of the tensile section 26 of the nipple. Means are provided on the exterior surface of the tensile section of the nipple to grip the wires 13 of the cable hose. In the illustrated embodiment of the present invention, these cable gripping means comprise a plurality of lands 30 and shallow annular grooves 31 which are provided continuously along the length of the tensile section 26 of the nipple from the leading edge thereof to a radial shoulder 32 at the trailing edge of the tensile section of the nipple. It is not necessary, however, to provide the lands and grooves as shown in the drawings and it has been found that the tensile section of the nipple may be made of uniform diameter and knurling (not shown) may be provided about the exterior of the tensile section of the nipple for the purpose of securely gripping the wires 13.

The intermediate sleeve 22 is of generally cylindrical shape with the forward end of the inner surface beveled or flared outwardly as at 33. The rearward end of the sleeve 22 terminates in an inwardly-extending flange 34 adapted to be received upon assembly of the coupling and hose within the annular recess 29. Preferably, the sleeve 22 is of lesser axial extent than the pressure sealing section 25 of the nipple 20. The outer ferrule 23 is also generally cylindrical in shape and terminates at its forward end in a section 35 of reduced thickness which preferably extends beyond the forward end of the nipple 20. The rearward end of the outer ferrule 23 terminates in an inwardly-extending flange 36 adapted to be received in an annular recess 37 provided in the nipple 20 intermediate the shoulder 32 and the nipple coupling section 24.

To assemble the coupling of the present invention to a cable hose, the cable hose must first be prepared to receive the coupling. To accomplish this, the wires 13 are unravelled back to expose the end of the hose body 11 and the spring 12. The hose body 11 is then cut back a distance equal to the distance between the shoulders 28 and 32 and the spring wire is cut inwardly from the terminal edge of the hose body a distance slightly less than the axial length of the intermediate sleeve 22.

After preparation of the hose end as described above, the intermediate sleeve 22 is positioned about the forward pressure sealing section 25 of the nipple 20 with its inwardly-directed shoulder 34 overlying the annular recess 29. The exposed end of the inner hose body 11 is then inserted into the annular gap between the nipple and intermediate sleeve into engagement with the shoulder 28 with the terminal end of the spring wire 12 in engagement with the forward end of the intermediate sleeve. Thereafter, the intermediate sleeve 22 is swedged or otherwise reduced in diameter to the position as shown in FIG. 2 to interlock the intermediate sleeve with the hose body and nipple and simultaneously create a pressure seal between the inner hose body 11 and the nipple 20.

To complete the assembly of the hose and coupling, the wires 13 are wound about the periphery of the intermediate sleeve 22 and about the tensile section 26 of the nipple 20 as shown in FIG. 2. Preferably, in this winding of the wires, the wires are replaced in the same arrangement they were in prior to the hose end being prepared for connection to the coupling. The outer ferrule 23 is positioned about the wires and nipple with its flange 36 overlying the nipple recess 37. Thereafter, the outer ferrule 23 is swedged or otherwise reduced in diameter to the position as shown in FIG. 3 in which the inwardly directed ferrule flange 36 is positioned within the nipple recess 37 and the wires 13 are securely gripped between the ferrule and the nipple. Swedging of the outer ferrule is accomplished along its entire length and to such an extent that the wires 13 are distorted and forced into the grooves 31 of the tensile section of the nipple and are further gripped between the outer surface of the intermediate sleeve and the ferrule.

From the foregoing it will be seen that the present invention provides a novel cable hose coupling having separate pressure and sealing sections which is of relatively simplified construction and which can be manufactured and assembled easily and cheaply.

We claim:

1. A high tension coupling for cable hose of the type comprising a tubular hose circumscribed by a wound, ribbon-like spring, a portion of said hose projecting from said spring, a plurality of wires wrapped in at least one direction around said hose and spring and extending axially beyond the terminal end of said hose, said coupling comprising a substantially cylindrical nipple having an axially extending bore therein, said nipple including a forwardly extending terminal end portion having a serrated exterior positioned interiorly of the hose and terminating within said spring, and an axially spaced rearward terminal end portion having means thereon for permitting connection to an adjacent coupling; a first radially extending shoulder adjacent said forward terminal end portion merging into a wire gripping portion; a second shoulder axially spaced from said first shoulder and extending radially from said gripping portion, said wire gripping portion being of an axial extent substantially equal to the axial extent of said wire beyond the terminal end of said hose and receiving thereon said extending wire ends, an anchoring portion intermediate said second shoulder and said rearward terminal end portion; a tubular sleeve about the portion of the hose projecting from said spring and coaxial with and overlying a portion of the forward terminal end portion of said nipple from said first axial shoulder toward but terminating short of the forward end of said forward terminal end portion, said tubular sleeve being radially contracted for its entire length to securely lock said hose portion between said sleeve and said forward terminal end portion; a coaxially mounted tubular ferrule for circumscribing relation with respect to said forward terminal end portion, said gripping portion and said anchoring portion and overlying said extending wire ends ad the hose portion and spring portion and surrounding the forward terminal end portion and wire gripping portion of said nipple; said ferrule having means thereon for coacting engagement with said anchoring portion of said nipple; and said ferrule being radially contracted for the entire extent of overlap with said forward terminal end portion and said wire gripping portion and caused to flow into and around said wire causing said wire to grip said nipple to inhibit slip caused by tension applied between said cable hose and said coupling.

2. A high tension coupling for cable hose of the type comprising a tubular hose having a plurality of wires wrapped in at least one direction around said hose and extending axially beyond the terminal end of said hose, said coupling comprising a substantially cylindrical nipple having an axially extending bore therein, said nipple including a forwardly extending terminal end portion positioned interiorly of the hose, a rearward terminal end portion axially spaced from said forwardly extending terminal end portion and having means thereon for permitting connection to an adjacent coupling, and an intermediate wire gripping portion positioned between and axially aligned with said forwardly extending terminal end portion and said rearward terminal end portion, said intermediate wire gripping portion being of an axial extent substantially equal to the axial extent of the wire beyond the terminal end of said hose and receiving thereon said extending wire ends; a tubular sleeve about the terminal end portion of the hose and coaxial with and overlying at least a portion of the forward terminal end portion of said nipple, said tubular sleeve being radially contracted for its entire length to securely lock said hose portion between said sleeve and said forward terminal end portion, said tubular sleeve underlying and in engagement with said wire; and a tubular ferrule positioned coaxially with said nipple in circumscribing relation wth respect to said forward tubular end portion and said intermediate wire gripping portion and overlying said extending wire ends about said intermediate wire gripping portion and said wire about said tubular sleeve and surrounding the forward terminal end portion of the nipple, and said ferrule being radially contracted for the entire extent of overlap with said forward terminal end portion of said nipple and said intermediate wire gripping portion of said nipple forcing said wire into pressure-applying relationship with said tubular sleeve and causing said wire to grip said intermediate wire gripping portion of said nipple to inhibit slip caused by tension applied between said cable hose and said coupling.

3. A coupling for cable hose in accordance with claim 2 in which anchoring means is provided in said nipple between said intermediate wire gripping portion and said rearward terminal end portion, and said ferrule has means thereon interlocked with said anchoring portion to secure said ferrule to said nipple.

4. A coupling for cable hose in accordance with claim 3 in which said ferrule extends forwardly beyond the forward terminal end portion of said nipple.

5. A coupling for cable hose in accordance with claim 3 in which second anchoring means is provided in said nipple between said forward terminal end portion and said intermediate wire gripping portion, and said tubular sleeve having means thereon interlocked with said second anchoring means to secure said tubular sleeve to said nipple.

6. A coupling for cable hose in accordance with claim 3 in which means are provided on said wire gripping portion of said nipple to interlock and securely grip said wire when said ferrule is contracted about said wire.

References Cited

UNITED STATES PATENTS

| 2,121,624 | 6/1938 | Cowles | 285—149 X |
| 2,234,350 | 3/1941 | Muller | 285—149 |
| 2,825,364 | 3/1958 | Cullen et al. | 285—149 |
| 3,112,937 | 12/1963 | Williams | 285—149 X |

DAVE W. AROLA, Primary Examiner

U.S. Cl. X.R.

285—256